United States Patent [19]

Weeden et al.

[11] 4,263,237
[45] Apr. 21, 1981

[54] METHOD OF MAKING EXPANDABLE MEMBER FOR FORMING SEALS AND APPLYING FORCE

[76] Inventors: Frank G. Weeden, 1515 Huge Oaks, Houston, Tex. 77055; R. Don Foster, 1116 Waugh Dr., Houston, Tex. 77019

[21] Appl. No.: 964,300

[22] Filed: Nov. 28, 1978

Related U.S. Application Data

[62] Division of Ser. No. 684,835, May 10, 1976, abandoned.

[51] Int. Cl.³ .............. B29C 1/02; B29C 3/00; B29D 3/00; B29H 9/00
[52] U.S. Cl. .................. 264/219; 264/130; 264/261; 264/263; 264/264; 264/267; 264/314
[58] Field of Search ............ 264/275, 278, 314, 130, 264/219, 261, 263, 264, 267

[56] References Cited

U.S. PATENT DOCUMENTS

| 3,346,924 | 10/1967 | Lombard | 425/419 |
| 3,585,828 | 6/1971 | Roper | 425/DIG. 14 |

OTHER PUBLICATIONS

Anon., Mod. Plastics Encyclopedia, McGraw-Hill, N. Y. (1964), pp. 167–170, relied on.

Primary Examiner—James B. Lowe
Attorney, Agent, or Firm—Browning, Bushman & Zamecki

[57] ABSTRACT

An expandable member is disclosed that includes a molded body of elastomeric material with a core embedded therein. At least a portion of the core is not bonded to the body. A fluid conduit is provided through which fluid can be injected between the core and the unattached portion of the body to move the core and the unattached portion apart and expand the member.

7 Claims, 16 Drawing Figures

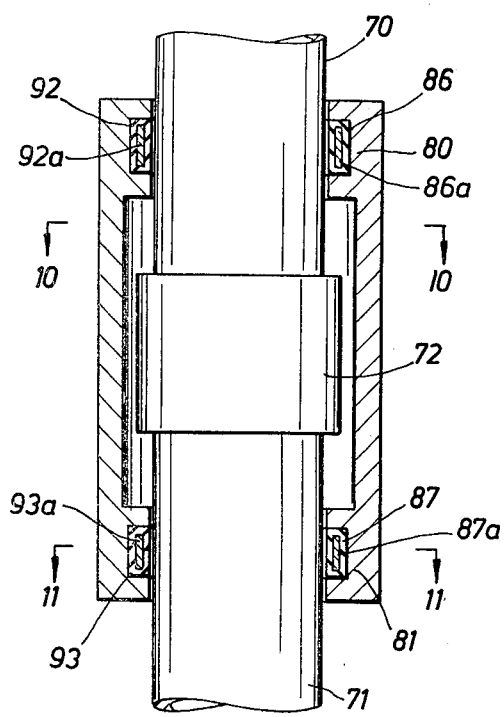
FIG. 9
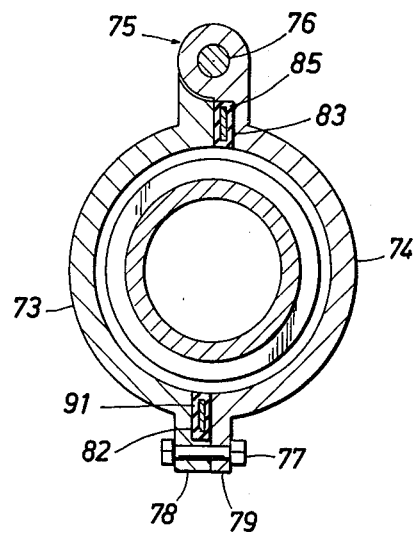
FIG. 10
FIG. 11
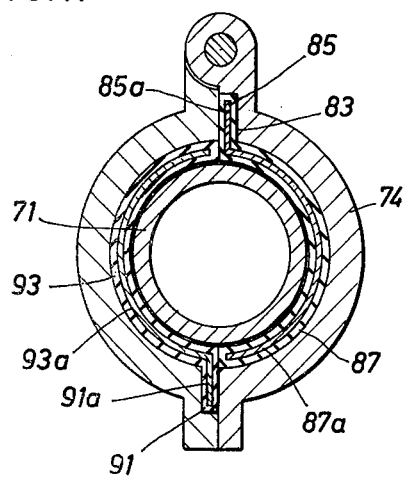
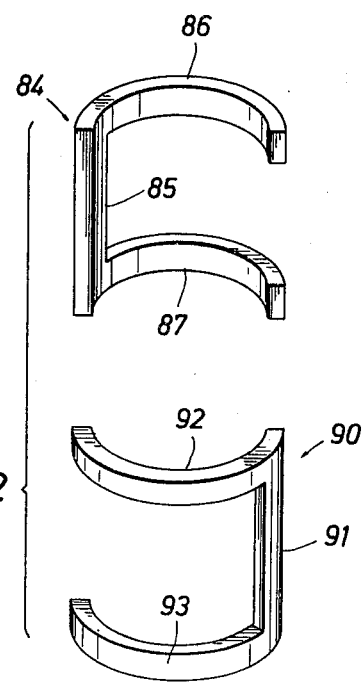
FIG. 12

METHOD OF MAKING EXPANDABLE MEMBER FOR FORMING SEALS AND APPLYING FORCE

This is a division of application Ser. No. 684,835, filed May 10, 1976, now abandoned.

This invention relates generally to members that are expanded by fluid pressure to form seals, transmit force, and the like.

The expandable member of this invention has many uses. There are many applications for an expandable member having a body that can be molded to any desired shape with a cavity that is formed therein during the molding process that has a pre-selected size, shape, and location, and it is an object of this invention to provide such a member and a method of making the same.

One use for the member of this invention is in the isostatic molding process where granular or powdered material is compacted to the desired shape. It is very important that the material be subjected to a substantially uniform compressive force. In the past, membranes having relatively thin walls were used. The membranes encircled the material to be compacted and were generally open-ended cylinders. Pressure on the outside forced the membranes against the material with the desired compacting pressure. The pressure fluid was confined to act against the outside of the membrane by holding the ends of the membrane in sealing engagement with the mode body. As the compacting pressures increase, it becomes more and more difficult to keep the pressure fluid from leaking around the ends of the membrane.

It is another object of this invention to provide an expandable member for use in an isostatic compacting press having a molded body with an internal cavity that is connected to a source of pressure fluid through a conduit thereby eliminating the need to maintain a seal between the member and the body of the press.

It is another object of this invention to provide an expandable member for an isostatic press having a molded body that can be shaped to compact the material to the desired configuration.

It is another object of this invention to provide an expandable member for an isostatic press having a molded body that can be provided with a pre-selected wall thickness around the cavity that will confine the pressure to be applied thereto while allowing the desired expansion of the member.

Another application of the expandable member of this invention is for sealing between adjacent surfaces. There are two general types of seal members, compression energized and pressure energized. The first type must be designed originally to have sufficient compression that when installed to maintain a seal against the maximum pressure differential expected in service. The pressure energized seal theoretically will increase the sealing pressure directly as the pressure increases. It is an object of this invention to provide an expandable member for use as compression type seal that allows the compressive force exerted by the member on the sealing surface to be controlled by a second source of pressure fluid so that such force can be varied as required by the pressure differential across the seal.

These and other objects, advantages, and features of this invention will be apparent to those skilled in the art from a consideration of this specification, including the attached drawings and appended claims.

In the drawings:

FIG. 9 is a vertical sectional view of a housing for enclosing a threaded connection between two tubular members with the expandable member of this invention arranged to provide a seal between the sections of the housing and between the housing and the tubular members to allow the connection to be tested by external pressure;

FIG. 10 is a sectional view taken along line 10—10 of FIG. 9;

FIG. 11 is a sectional view taken along line 11—11 of FIG. 9;

FIG. 12 is an isometric view of the two seal members used in the embodiment of FIGS. 9, 10 and 11;

Figure 1:
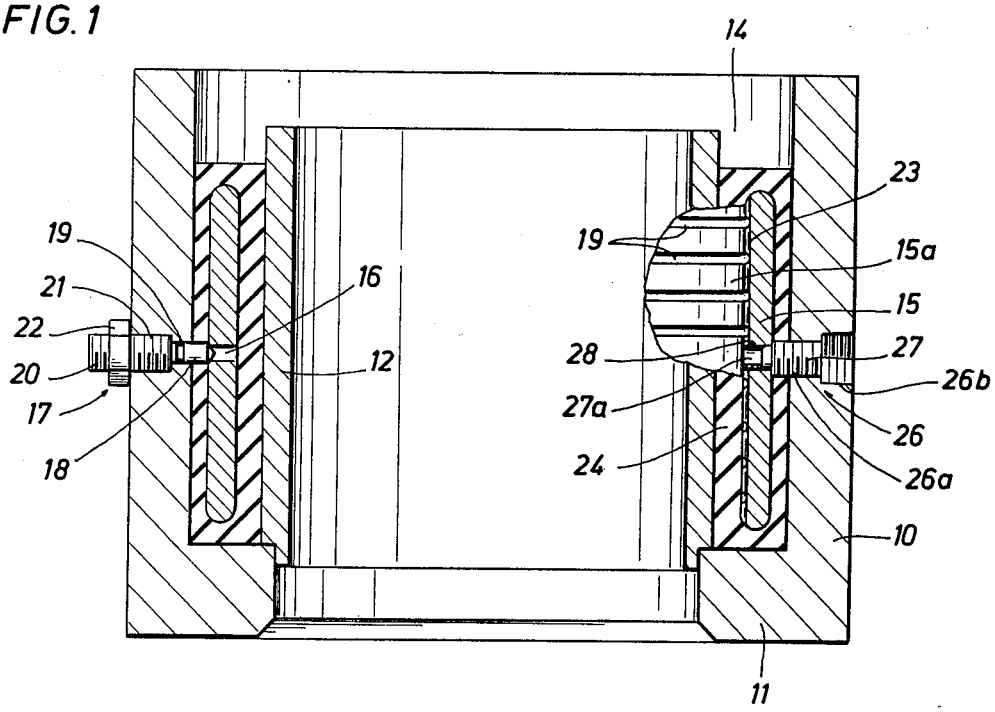
FIG. 1 is a sectional view through a mold in which the expandable member of this invention has been constructed in accordance with the method of this invention.

The mold of FIG. 1 is designed to provide the desired shape to an expandable member constructed in accordance with the method of this invention for use in an isostatic press. In fact, in this embodiment, part of the mold is also part of the press. The mold includes annular member 10 having inwardly extending lower flange 11. Tubular member 12 comprises the inside portion of the mold and is notched on its lower end to be centered by the upper edge of flange 11. Between outer tubular member 10 and inner tubular member 12 is annular space 14 in which the body of elastomeric material will be molded to the desired shape. In this case, the shape is annular.

Located in space 14 is annular core 15. In accordance with this invention, core 15 is made of a material or is coated with a material that will keep the elastomeric material of the body from bonding or attaching itself to at least a portion of the surface of the core. Preferably, the core is made of a material having sufficient structural strength to be self-supporting. The material for the core can be chosen from the plastics, such as nylon, polyethylene, and polypropylene, or from the metals, such as aluminum or steel. If the material used for the body would tend to bond to the core material, the core, or that surface to which the body is not to bond, may be coated with a releasing agent, such as the soap solutions or silicon base liquids that are commonly used in rubber molds and the like.

The core is embedded in the elastomeric material of the member, therefore it is supported in mold cavity 14 in the desired position before the mold is filled with the material to form the body of the expandable member. In the embodiment shown in FIG. 1, core 15 has a plurality of openings 16, only one of which is shown in the figure, spaced around the core. Threaded centering pins 17 are mounted in tapped holes around outer mold member 10 with their tapered ends engaging holes 16 to support and center the core in the mold cavity. The centering pins include unthreaded sections 18 that carry seal rings 19 to seal between the centering pins and the mold body to keep the elastomeric material from escaping during the molding operation. Threaded sections 20 that engage tapped portions 21 of the openings allow the pins to be adjusted to center the core. Locknuts 22 hold the pins in the desired position.

With the core firmly held in the mold cavity, the cavity can be filled with elastomeric material to form body 24 of the expandable member. The mold shown in FIG. 1, is designed to use an elastomeric material that can be placed in the mode cavity as a liquid, after which it will cure into a solid rubber-like material. For services as a part of a compacting press, polyurethane is the preferred material for the body of the expandable member. This material can be mixed with a curing agent as a liquid, poured into the mode cavity up to the level desired, after which, it will cure into a solid elastomeric material having good properties for use as the compacting force transmitting member of a compacting press.

As explained above, a cavity is formed in the molded body during the molding operation. This is accomplished by providing core 15, which at least a portion of the surface thereof will not bond to the elastomeric material of the body. In the expandable member, being made in FIG. 1, the inner portion of the elastomeric body will move inwardly to compact the material in the press. Therefore, in this embodiment the inner surface of annular core 15 should be of such a material, or coated with such a material, that the body of elastomeric material will not bond or attach itself to the inner surface of the core. Since there is no bond between inner surface 15a and body 24 of elastomeric material, a cavity exists between the unattached portion of body 24 adjacent the inner surface of core 15. By supplying fluid under pressure into this cavity or potential cavity, the unattached portion of the body can be forced away from the core to expand the member.

The space between the core and the adjacent unattached portion of the body of the member may be substantially non-existant, since, before having been expanded the unattached portion may well be in contact with the core. In this respect, the cavity may be better described as a potential cavity that will exist when the unattached portion is forced away from the core. Once expanded, the unattached portion will probably not return to the same intimate contact with the core and a cavity will exist thereafter. As used in this specification, "cavity" is intended to mean both existing and potential spaces.

Conduit means are provided through which fluid under pressure can be supplied to force the unbonded or unattached portion of the body and the core apart to expand the member. In the embodiment shown in FIG. 1, outer annular member 10 of the mold has tapped opening 26 extending through the member. This tapped opening is of two diameters. The inner, smaller diameter portion 26a is provided with straight threads, whereas the outer portion 26b is tapped for tapered pipe threads. Before the body of elastomeric material is molded, threaded nipple 27 is threaded to straight thread section 26a. The nipple includes an unthreaded portion 27a that extends into opening 28 through the core. A solid pipe plug is connected to the tapered thread section to seal the opening.

The mold cavity is then filled with the elastomeric material, which, as explained above, in this embodiment is initially liquid. After the material has cured into a solid body of elastomeric material, it will be bonded to and in sealing engagement with the exposed portion of threaded nipple 27 as well as the inside wall surface of housing or annular member 10. The pipe plug is removed and the body material is drilled out of nipple 27. A conventional pipe nipple can now be connected to outer portion 10 of the mold and fluid under pressure can flow through threaded nipple 27 and into the cavity formed between the core surface 15a and body 24 of elastomeric material.

As shown in FIG. 1, inside surface 15a of the core can be provided with spaced parallel circular grooves 19 that intersect transverse groove 23 which connects grooves 19 to the outlet of nipple portion 27a. Such a network of grooves will allow the pressure fluid to be quickly spread around the inside surface of the core while expanding. They also provide return paths when the member is contracting and forcing the fluid out of the cavity. To keep the grooves from being filled during the molding operation, they may be filled with a solid or semi-solid material that can be dissolved or washed from the grooves after the elastomeric material has cured.

Figure 2:
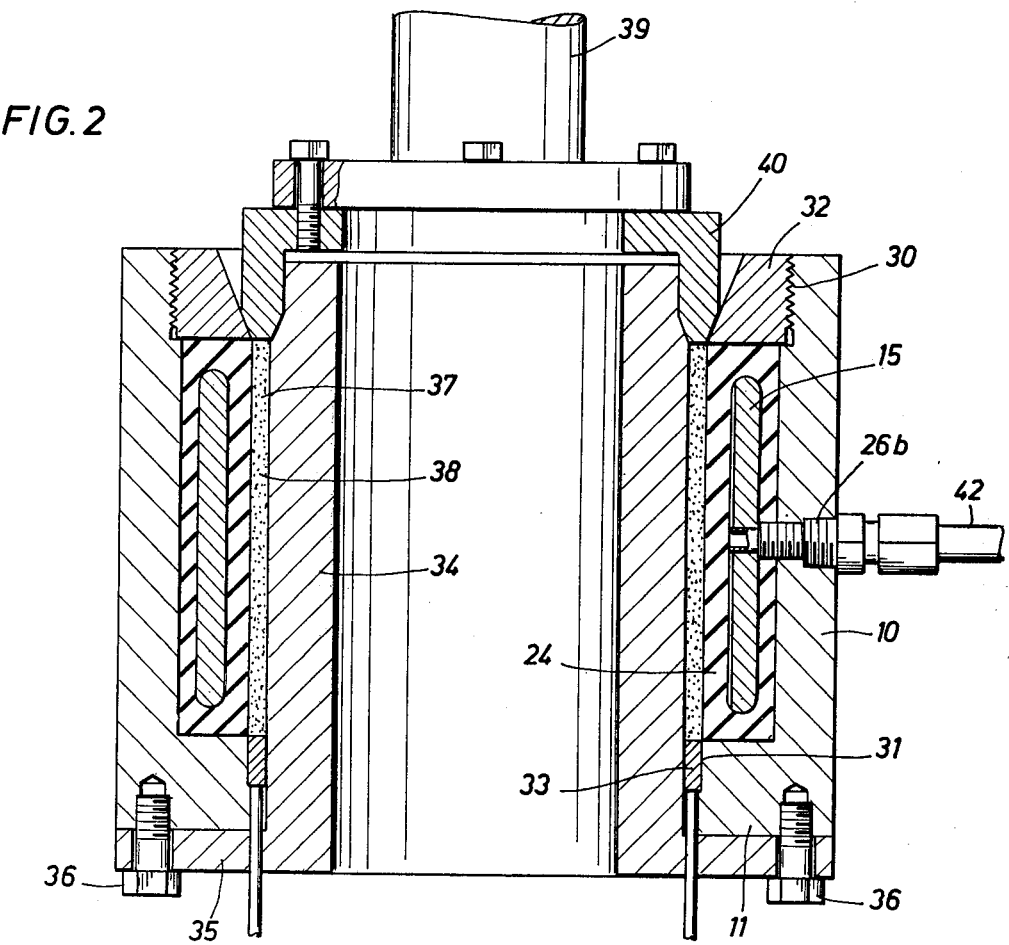
FIG. 2 is a sectional view through an isostatic mold using the expandable member formed in the mode of FIG. 1 to apply pressure isostatically to a granulated mass of material.

As stated above, the particular expandable member molded or cast in the mode of FIG. 1 is designed for use in an isostatic press. This arrangement is shown in FIG. 2. After the elastomeric material has cured, inner mold member 12 is removed and certain maching operations are conducted on outer mold member 10 to prepare it for use in the press. These consist of cutting threads 30 at the upper end of the mold body and cutting an annular groove 31 in flange portion 11 of the body. Cap ring 32 is connected to the body through threads 30 to confine the upper end of the expandable member. This leaves only the inner surface of the member free to move when the cavity inside the member is supplied with fluid under pressure. Annular groove 31 in flange 11 receives annular ring 33 which, as will be explained below, is used to push the compacted material out of the press.

The other parts of the press shown include mandrel 34 which is generally cylindrical in shape and extends through the opening of flange 11 to provide the inner surface against which the material will be compacted. Flange 35 is attached to mandrel 34 and in turn to body 10 of the press by machine screws 36. Cavity 37 between the mandrel and the expandable member receives material 38 to be compacted. This material is powdered or granular material, such as tungsten carbide or one of the fluorocarbons. After cavity 37 is filled with granular material 38, ram 39 moves annular closure member 40 into the position shown in FIG. 2 to close the upper end of cavity 37.

Figure 3:
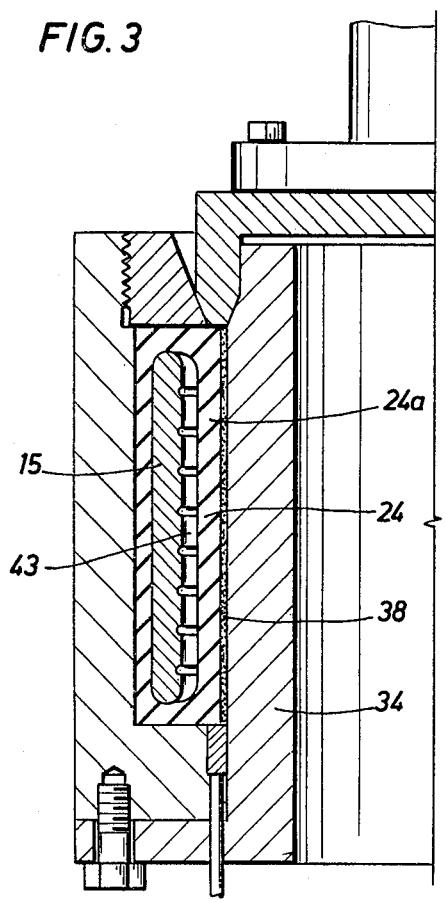
FIG. 3 is a partial sectional view of the press of FIG. 2 showing the expandable member applying pressure to compact the material to the desired shape.
Figure 4:
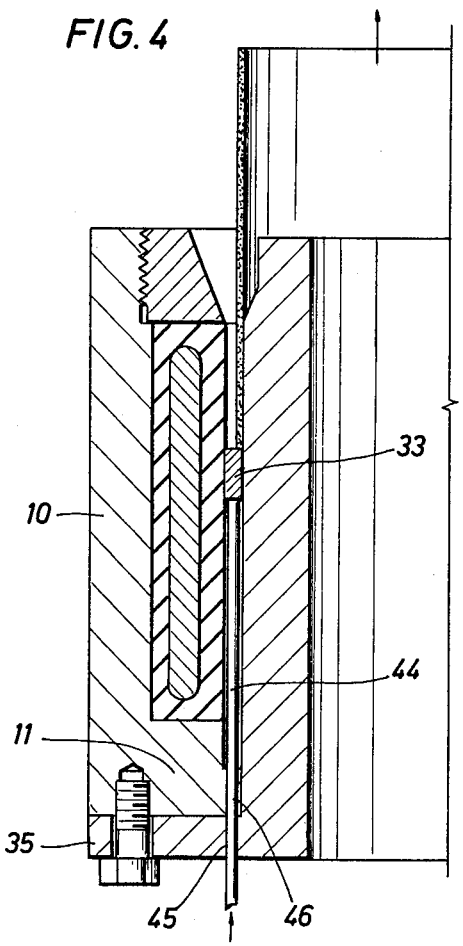
FIG. 4 is a view similar to FIG. 3 of the press of FIG. 2 showing the removal of the compacted material from the press.

At this point in the operation of the press, everything is ready to apply pressure isostatically to the material to compact it the desired amount. As explained above, a conduit, such as tubing 42, is connected to tapped portion 26b of body 10 and fluid under pressure can be supplied to cavity 43 between the unattached portion of body 24 and core 15 to cause the member to expand. This action is shown in FIG. 3, where the fluid has forced portion 24a of the body of elastomeric material away from core 15 and in doing so has exerted an isostatic pressure on granulated material 38, compacting this material against the outer surface of mandrel 34. In this compacting operation, the elastomeric material of the expandable member can expand only in the direction toward the granulated material. It is confined in all other directions. As the pressure builds up inside cavity 43 between the core and the unattached portion of the body, the elastomeric material will act more and more like a fluid and transmit the fluid pressure uniformly against the granulated material in the press. This is the great advantage of isostatic molding processes in general and it is also obtained using the novel expandable member made in accordance with the method of this invention. In FIG. 4, pressure has been released from cavity 43 and ring 33 is pushing the tube of compacted granulated material from the press after the ram has moved the upper retaining member 40 upwardly and out of the way. Ring 33 is moved by a plurality of rods 44, only one of which is shown, that extends through aligned openings 45 and 46 in flanges 35 and 11, respectively.

Figure 5:
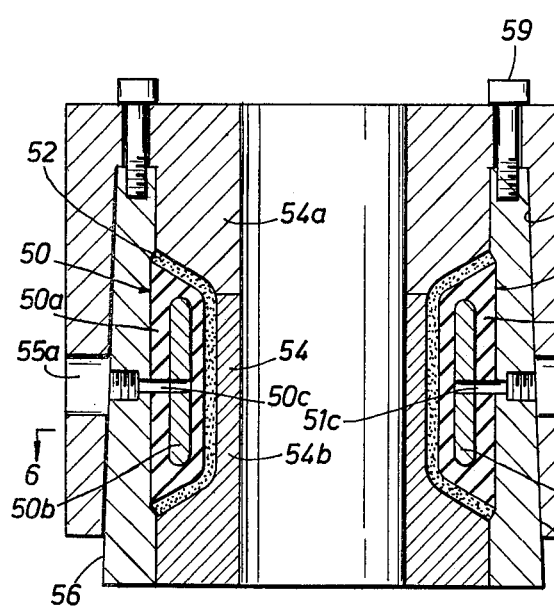
FIGS. 5 and 6 show the expandable member of this invention adapted to compact granulated material into the shape of a valve seat.
Figure 6:
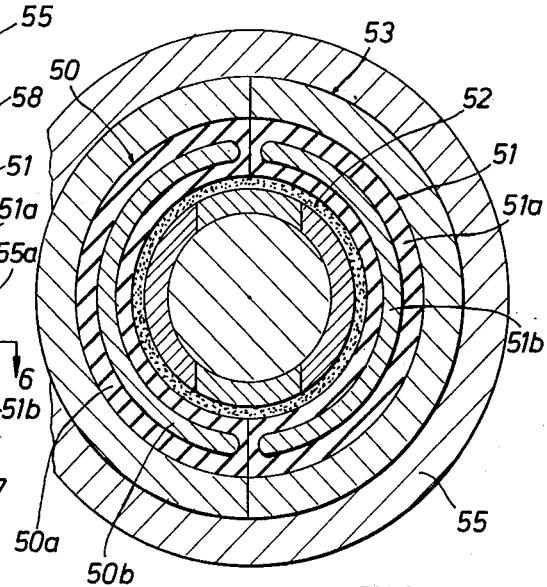
Figure 7:
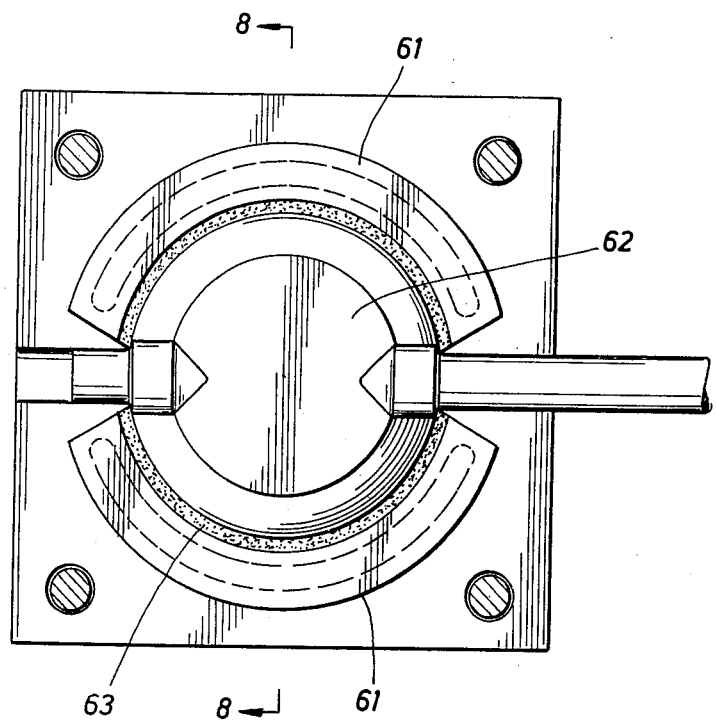
FIGS. 7 and 8 show the arrangement whereby the expandable member of this invention is arranged to compact granulated material on the outside of a valve disc.
Figure 8:
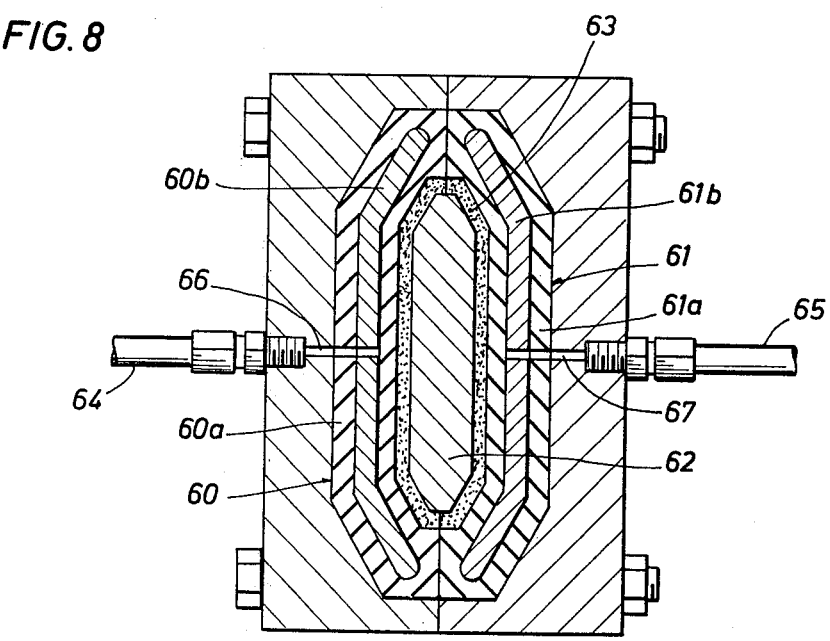

In FIGS. 5 through 8, two additional mold arrangements are shown that use different shapes of the expandable member of this invention. In FIGS. 5 and 6, a mold is designed employing the expandable member of this invention to form a valve seat for a butterfly valve out of one of the fluorocarbons. In FIGS. 7 and 8, a mold is provided for coating the outside surface of the disc of a butterfly valve with a fluorocarbon coating.

The press of FIGS. 5 and 6 includes two expandable members 50 and 51. They include bodies of elastomeric material 50a and 51a, in which are embedded cores 50b and 51b, respectively. The two members combine to form a complete ring around cavity 52 in which granulated or powered material is placed to be compacted. Each member is located in one half of split mold 53 and the members encircle mandrel 54 which comprises two pieces 54i a and 54b that are designed to allow the finished product, the valve seat, to be removed from the mold after the molding operation. Portion 54a of the mandrel is an integral part of outer ring 55 which holds the two halves of the mold in position during the molding operation. The two halves of the mold are forced together by the wedging action of tapered outer surfaces 56 and 57 of the mold halves and tapered inner surface 58 of ring 55. The ring is held in place by bolts 59. Holes 55a in the ring allow the conduits (not shown) for the pressure fluid to be connected to passageways 50c and 51c to supply pressure to expand the members and compress the granular material in cavity 52. Passageways 50c and 51c are drilled through bodies 50a and 51a after they are molded. The bodies are bonded to the inside surface of split mold 53 to confine the fluid to the passageways.

In FIGS. 7 and 8, expandable members 60 and 61 made in accordance with invention, are designed to compact coating 63 of granular material on the outer surface of a butterfly valve disc. The members include bodies of elastomeric material 60a and 61a with cores 60b and 61b embedded therein. Each member shown in FIG. 8 is shaped to enclose one half of disc 62. In FIG. 7, the ends of member 61 are shown with the shape of the core shown by dotted lines. The abutting ends of the members act to confine circumferential expansion and combine with the mold body to limit expansion except in the direction of the granulated material. As before, the pressure of the fluid supplied between the cores and the inner portion of the bodies of the members through conduits 64 and 65 and passageways 66 and 67 will be transmitted through the elastomeric material substantially uniformly over the entire surface being compressed at the operating pressure of the mold to provide a uniform layer of compacted material over the outside of the valve disc.

In the embodiments described above, the expandable member of this invention is used to transmit a force, specifically to provide a uniform compacting force to a body of granular or powdered material. In the embodiment shown in FIGS. 9 through 12, the expandable member of this invention is adapted for use as a seal against differential pressure. Specifically, in this embodiment the expandable member is designed for use with a testing device for applying pressure externally to a connection between two tubular members to test the joint for adequacy of seal.

In FIG. 9, the threaded ends (not shown) of tubular members 70 and 71 are connected together by collar 72. After the two joints are connected together, it is desirable in many instances to test the connection before placing the connection in service. One way of testing such connections is to subject the connection to an external pressure of a predetermined amount. In order to conveniently provide such a test, a split housing must be used that can be clamped around the connection and then removed. Otherwise, the housing would have to be slipped down over the pipe from one end, which in many cases would be awkward. Also, the threaded connection often has a portion, such as collar 72, that is larger in diameter than the pipe and would create sealing problems. Therefore, the housing of the testing apparatus is split so that it can be asembled around the connection and then removed after the test is completed.

In the embodiment shown, the housing includes sections 73 and 74 that are semi-circular in cross section. The two sections are connected together by hinge 75 which includes hinge pin 76, as shown in FIG. 10. When the two halves are brought together around the pipe, their free ends are connected by bolts 77 that extend through mating flanges 78 and 79 that extend along the abutting edges of the housing sections. Each housing section has longitudinally spaced arcuate flanges that will form annular rings 80 and 81 at opposite ends of the housing to support a seal ring adjacent to the outer surface of pipe joints 70 and 71, respectively. A seal must also be provided between the two halves of the housing where they abut along a line parallel to the longitudinal axis of the pipe.

As shown in FIG. 10, housing section 73 is provided with groove 82 to receive a seal member to engage the abutting surface of section 74 of the housing. In the same way, section 74 has groove 83 for the same purpose along the opposite longitudinal seal between the two housing member.

To seal the housing, two expandable members constructed in accordance with the method of this invention are provided. The two seal members are shown isometrically in FIG. 12. Seal member 84 has straight section 85 for positioning in groove 83 of housing section 84. Integrally attached thereto at opposite ends are semi-circular seal members 86 and 87. These portions of the seal are carried in the inwardly extending arcuate flanges on opposite ends of housing section 74 that for annular portions 80 and 81. Seal ring 90 is shaped like seal ring 84. It has straight section 91 that is located in groove 82 of housing section 73. It is integrally connected at opposite ends to semi-circular portions 86 and 87 that combine with portions 86 and 87 of seal member 84 to form a complete seal between the end flanges 80 and 81 of the housing and the outside surface of pipe joints 70 and 71. Means (not shown) similar to the arrangement described above in connection with the embodiment of FIG. 1 are provided to expand seal members 84 and 90 and provide a seal between the housing sections and between the housing and the pipe so that pressure inside the housing can be built up to the desired point of test connection 72.

As shown in FIGS. 9 and 11, semi-circular portions 86, 87, 92, and 93 have semi-circular core sections 86a, 87a, 92a and 93a embedded therein, respectively. Here either the concave or the convex surface of the cores can be unattached to the elastomeric body of the member, since moving the cores toward the surface to be sealed will accomplish the same result as moving only the elastomeric material. This is also true of the embodiments described in FIGS. 5 through 8 and of straight sections 85 and 91 of the seals that have straight cores 85a and 91a. Straight core sections 85a and 91a are integrally connected at each end to semi-circular core sections 86a and 87a and 92a and 93a, respectively. This allows one pressure to be supplied between the cores and the unattached portion of the body of the seal members through one passageway (not shown), although more than one could be used if desired.

The pressure used to expand the seal rings of this invention need be only enough to seal against the differential pressure to be placed inside the housing. This increases the life of the seal members. As soon as the test is completed pressure can be released from the cavities of the seal rings and the housing can be quickly and easily removed from the pipe.

In all of the embodiments described above, the core in the expandable member of this invention has been generally symmetrical in shape. There may be occasions, however, when it would be desireable to apply the force of the expandable member in varying amounts to different portions of the material being compacted at various stages of pressurization of the expandable member. FIGS. 13 through 16 illustrate how this can be accomplished by changing the cross-sectional shape of the core.

Figure 13:
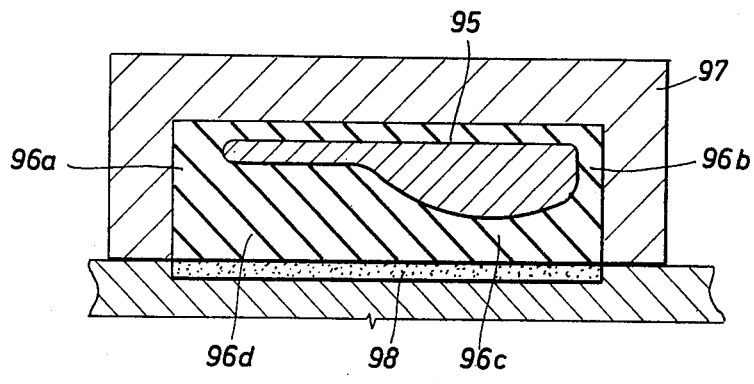
FIG. 13 is a sectional view through an alternate embodiment of the expandable member of this invention.
Figure 14:
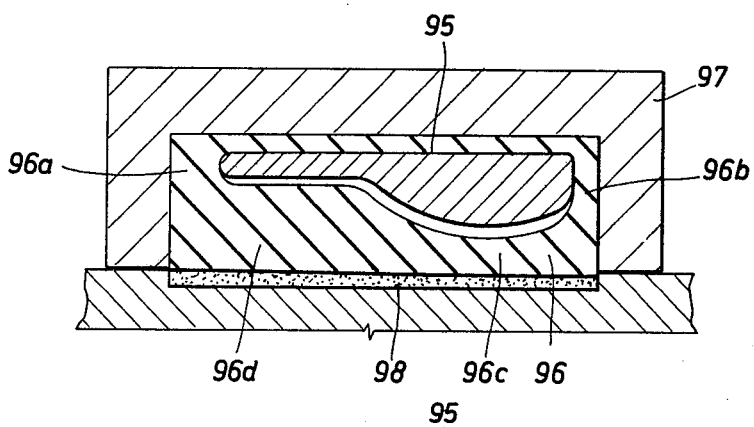
FIGS. 14, 15 and 16 are views similar to FIG. 13, with the member subjected to increasing the internal pressure.
Figure 15:
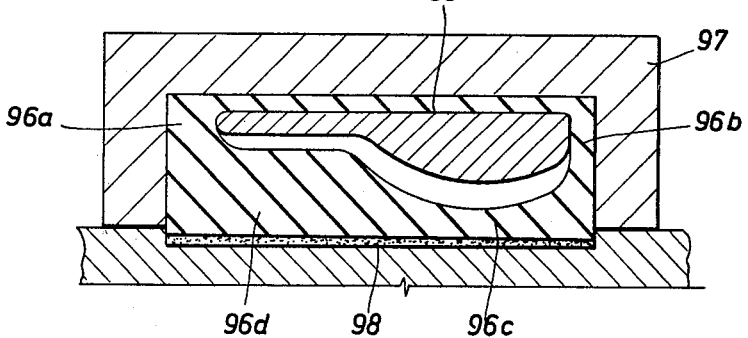
Figure 16:
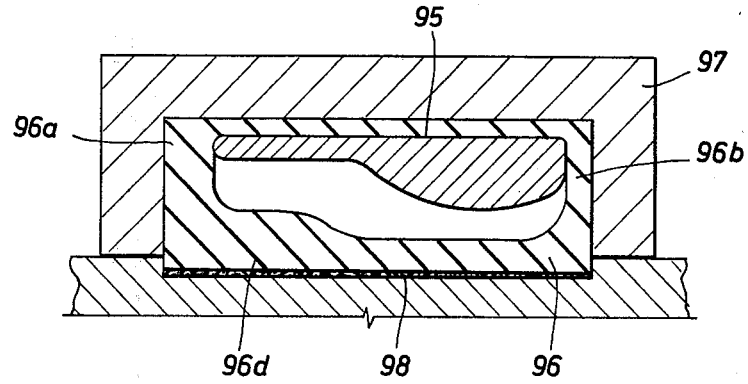

In FIG. 13, core 95 is thicker at one end than the other. Since, as shown, body 96 of elastomeric material is uniform in shape, this results in a thicker portion of elastomeric material between the core and the surface to be pressured at one end than there is at the other. Also, the end of core 95 on the right hand side is closer to the end walls of housing 97 than it is at the other end. Thus, portion 96a on the left hand end is thicker than portion 96b between the end of the core and the housing on the right hand end. Thus, as pressure is applied to the cavity between the core and the body, portion 96b will offer less resistance to movement than does portion 96a and relatively thin portion 96c will move initially further toward the material being compacted than will thicker portion 96d at the left hand end. As the pressure builds up, of course, the additional resistance to movement of the thicker sections on the left hand end will be less and less effective to cause this portion to lag behind the right hand portion until, as shown in FIG. 16, the pressure has reached the point where the elastomer is acting like a liquid and substantially uniform pressure is being applied to granular material 98. By causing the pressure to increase from the right hand side to the left hand side of the granular material, some of the material will be displaced in that direction and produce a tapered body of compacted material.

From the foregoing, it will be seen that this invention is one well adapted to attain all of the ends of objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the apparatus and method of this invention without departing from the scope thereof, it is to be understood that all matter herein set forth or shown in the accompanying drawings is to be interpreted as illustrative and not in a limiting sense.

The invention having been described, what is claimed is:

1. A method of making an expandable assembly for applying a force comprising:
    providing mold body means having a mold cavity therein, said mold body means including at least one mold member having a mold cavity surface facing into and partially defining said mold cavity and a bore opening through said mold cavity surface;
    positioning a rigid core in said mold cavity in spaced relation to said mold cavity surface of said one mold member, said core having a first surface facing generally toward said mold cavity surface, a second surface facing generally away from said mold cavity surface, and a bore opening through said second surface;
    providing conduit means in said mold cavity communicatively interconnecting the bores of said one mold member and said core;
    placing an elastomeric material, in non-solid form, in said mold cavity in surrounding relation to said core;
    causing said elastomeric material to solidify to a self-supporting elastomeric body with said core imbeded therein while permitting said elastomeric material to bond to said mold cavity surface and to said conduit means but preventing said elastomeric material from bonding to at least said second surface of said core, whereby a potential fluid cavity is formed between said elastomeric body and said second surface of said core for receiving fluid from said conduit means to expand said elastomeric body away from said second surface of said core, and whereby said one mold member may provide at least partial external support for said elastomeric body.

2. The method of claim 1 wherein said conduit means extends between said mold cavity surface and said first surface of said core and serves to at least partially support said core on said one mold member during said emplacing and solidifying of said elastomeric material.

3. The method of claim 1 wherein said expandable assembly, including said one mold member, said elastomeric body, said conduit means, and said core is employed as a unit to form a compacting press for compacting powdered material by expanding said fluid cavity to force said elastomeric body against such powdered material.

4. The method of claim 3 wherein said one mold member is used to form at least a portion of a rigid supporting framework of said compacting press.

5. The method of claim 4 wherein said mold cavity surface is concave.

6. The method of claim 5 wherein said one mold member is generally tubular and said mold cavity surface comprises the inner surface of said one mold member.

7. The method of claim 1 wherein said elastomeric material comprises polyurethane.

* * * * *